Oct. 29, 1940.	M. BOOTH	2,219,378
CHART FOR DETERMINING HOROSCOPES
Filed Jan. 8, 1938	4 Sheets-Sheet 1
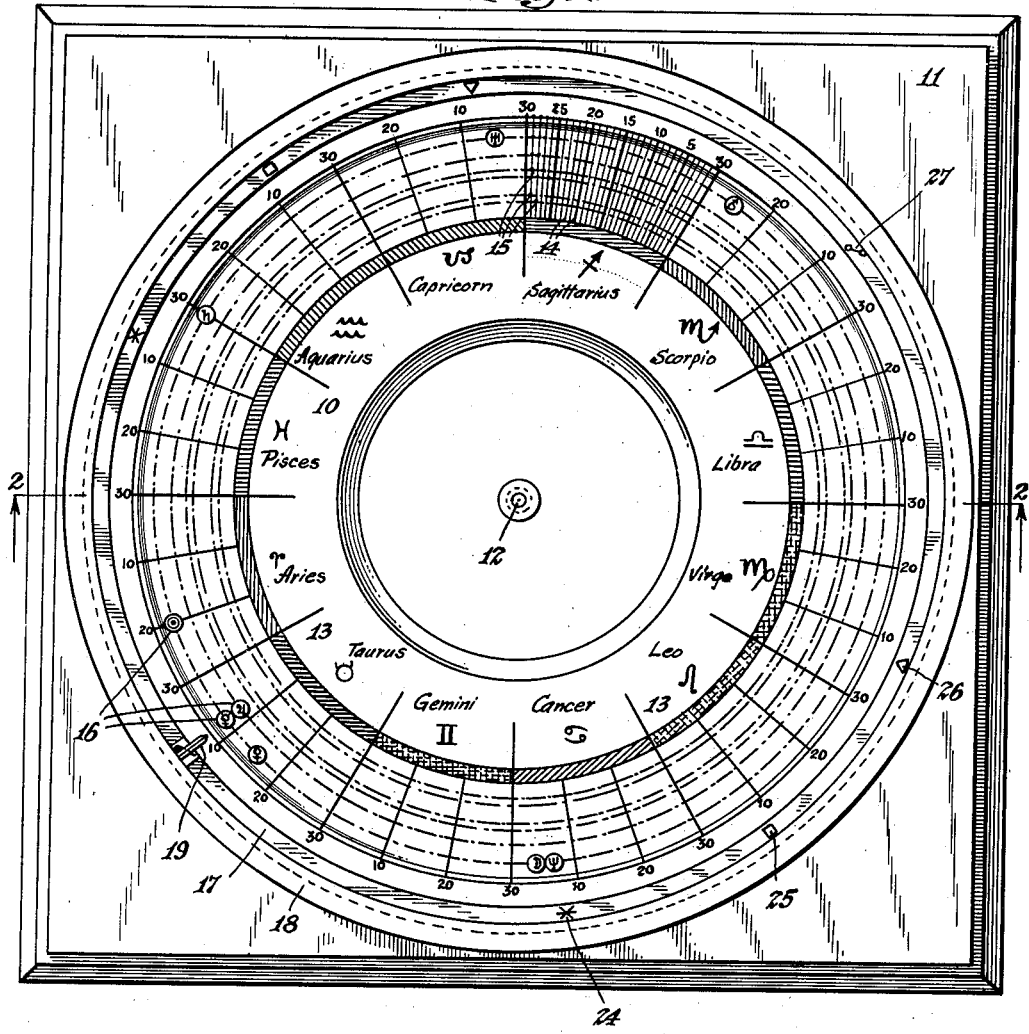
Fig.1.
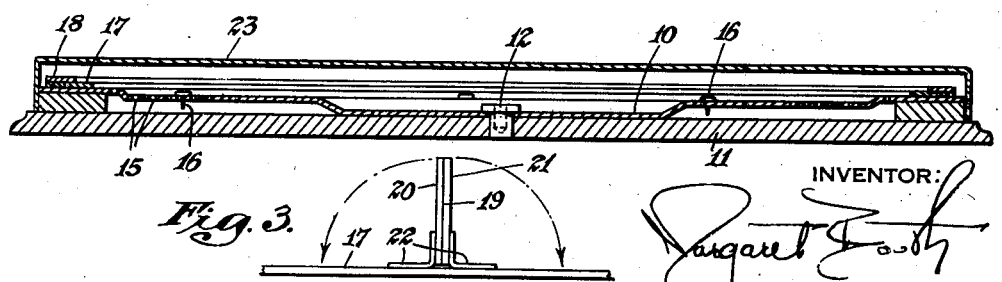
Fig.2.
Fig.3.
INVENTOR:

Oct. 29, 1940.  M. BOOTH  2,219,378

CHART FOR DETERMINING HOROSCOPES

Filed Jan. 8, 1938  4 Sheets-Sheet 2

INVENTOR
Margaret Booth

Oct. 29, 1940.  M. BOOTH  2,219,378
CHART FOR DETERMINING HOROSCOPES
Filed Jan. 8, 1938  4 Sheets-Sheet 3

INVENTOR:

INVENTOR:
Margaret Booth

Patented Oct. 29, 1940

2,219,378

UNITED STATES PATENT OFFICE 2,219,378

CHART FOR DETERMINING HOROSCOPES

Margaret Booth, New York, N. Y.

Application January 8, 1938, Serial No. 183,935

5 Claims. (Cl. 35—44)

This invention relates to astrological charts such as are used in casting horoscopes and has for its object to provide such a chart which is easy to work upon. Another object is to provide such a chart that is capable of simplifying and expediting the determination of aspects.

In the present state of the art aspects between planets, luminaries, house cusps, etc., and other heavenly bodies are found by carrying in mind the degrees which determine aspects and their orbs and then making written notes of the aspects found. This method is both tedious and subject to error. Some aspects such as the semi-square (45 degrees) are so tedious to determine that many astrologers neglect them although they are considered to be definitely effective. This invention overcomes these difficulties and reduces the possibility of error, avoiding the necessity for hunting, figuring or writing notations of aspects, inasmuch as with it, all aspects appear graphically and can be noted at a glance.

Referring to the drawings;

Fig. 1 exemplifies one embodiment of this invention.

Fig. 2 is a section on the line 2—2 of Fig. 1.

Fig. 3 is a detailed representation of the pointer or indicating means for orienting the aspect finder.

Figure 4:
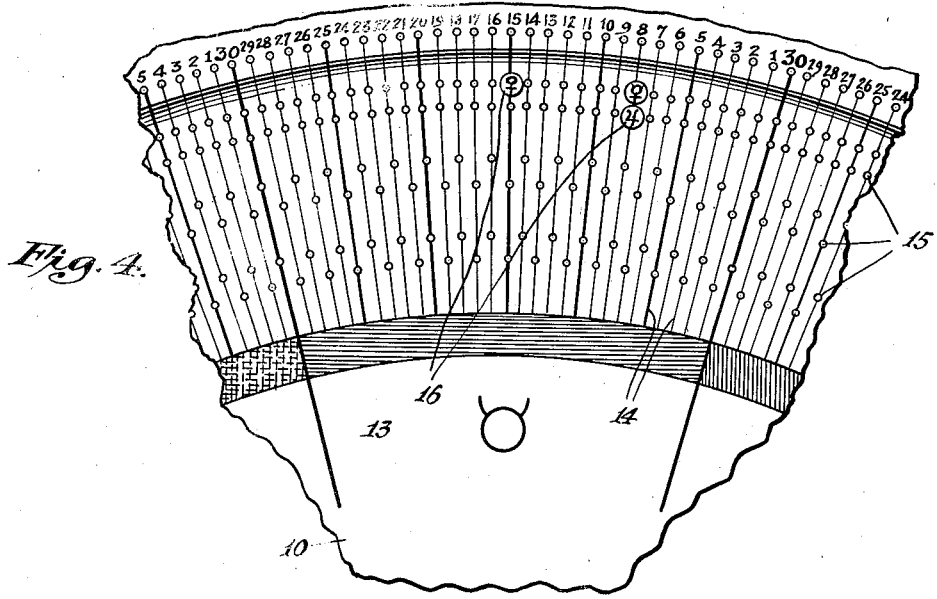
Fig. 4 is an enlarged view of one of the zodiacal segments of Fig. 1, showing the radial subdivisions thereof.

The chart 10 of Fig. 1 is shown as being of generally annular shape provided with a base 11, the center of the chart being at 12. The chart is shown as being provided with zodiacal segments, each of which is subdivided into radial portions to indicate the degrees in each segment. The segment of Fig. 1 between the nine and eight o'clock positions, as of a clock, symbolizes Aries and those progressing therefrom in a counter-clockwise direction represent respectively the zodiacal segments known as Taurus, Gemini, Cancer, Leo, Virgo, Libra, Scorpio, Sagittarius, Capricorn, Aquarius, Pisces. The conventional symbols for each segment are placed as indicated. As shown in Fig. 4, the radial subdivisions of each zodiacal segment is provided with a number of recesses 15, into which may be placed pins 16, having heads marked to indicate particular planets and other heavenly bodies. In Figs. 1 and 4 in eight degrees of Taurus are located two pins, the outermost of which symbolizes Mercury and the radially inner one Jupiter. In the center of the same zodiacal segment is located another pin symbolizing Venus. In Fig. 1 the two pins located in Cancer represent respectively the moon and Neptune. The pin shown in Fig. 1 in Scorpio symbolizes Mars. That located in Capricorn, Uranus, and the pin located on the dividing line between Pisces and Aquarius represents Saturn. The sun is marked at 20 degrees of Aries in Fig. 1. The manner in which these heavenly body indicating pins are located is familiar to those skilled in this art who are acquainted with the way of obtaining data for their location from an ephemeris.

Surrounding the zodiacal segments in Fig. 1, is an adjustable ring 17 for determining aspects of each of the indicating pins. This ring 17 is provided with a guard ring 18 for holding the aspect ring coaxial with the charts. A pointer 19 is fixed with respect to the ring 17. The ring and pointer are adjustable until the pointer is substantially radially aligned with one of the pins the aspects of which are to be determined. The usual aspect indications are marked on the ring 17. The marks occurring 60 degrees from the pointer represent the sextile, those at 90 degrees from the pointer, the square, those at 120 degrees, the trine, and that diametrically opposite, the opposition. These aspect marks are shown by the numerals 24 indicating the sextile, 25 the square, 26 the trine, and 27 opposition. The pointer in Figs. 1 and 3 is shown as comprised of two halves 20 and 21, each secured to an attaching piece 22 fixed to the ring 17 so that the halves 20 and 21 may be bent to lie substantially flat as shown by the dotted lines, for convenience in packing for shipment.

It is contemplated that the aspects may be determined at a glance enabling a layman to draw conclusions. For example, if information is sought regarding the type of mind of the person whose chart is shown, the segment of the chart in which Mercury appears would be read and it would indicate to one skilled in the art that Taurus qualities of persistence are present. The conjunction of Jupiter to Mercury indicates mental expansiveness while the sextile to Moon and Neptune in Cancer shows good memory and great imagination. As will be appreciated by those skilled in the art adjusting the pointer 19 until it is radially aligned with any planet indicating pin enables the aspects of this planet with the others to be determined at a glance and with ease and facility. As used in the appended claims, the term planet is not restrictive but generically used to cover the sun, moon and other celestial bodies as well as planets.

Figure 5:
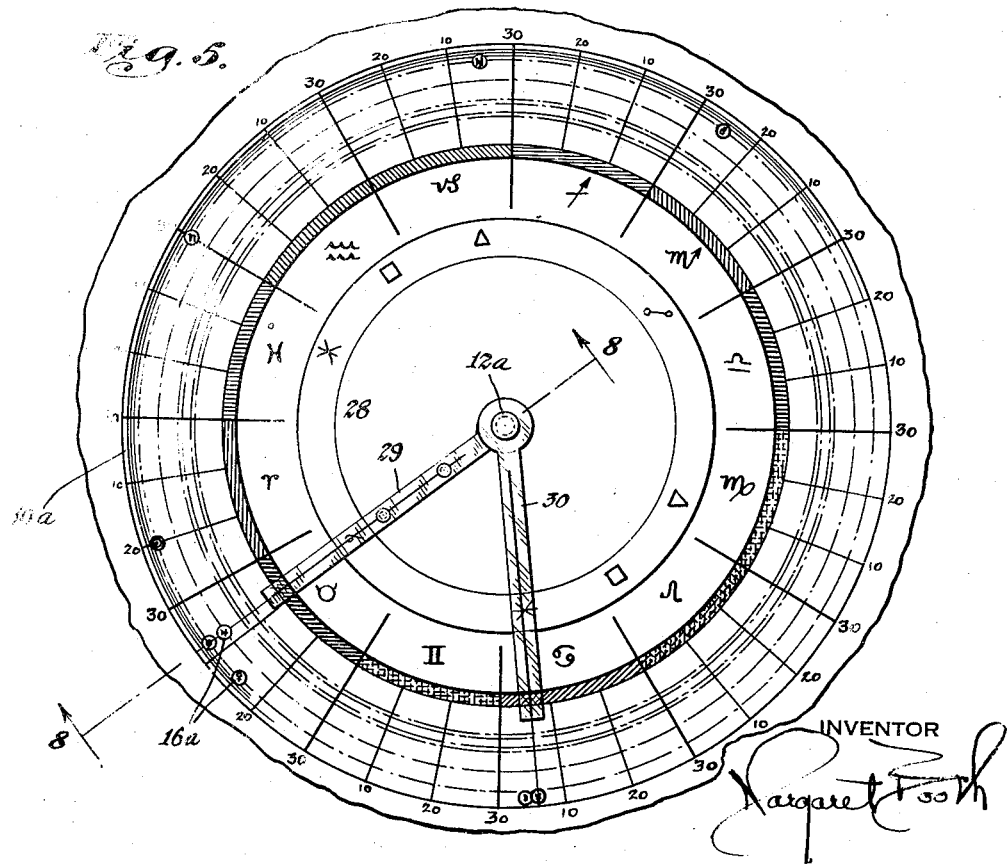
Fig. 5 shows another embodiment of this invention.

In Fig. 5 the chart 10a is similarly subdivided into zodiacal segments and fractions thereof. The aspect finder instead of being radially outside is located within the segments and designated by the numeral 28. Fixed with respect to the aspect finder 28 is a pointer 29 of transparent material like Celluloid and extending radially beyond the aspect finder so as to be easily aligned with the planetary indicating pin. Pivotally secured to the axis 12a of the chart and aspect finder is another arm 30 also of similar transparent material but adjustable with respect to the first arm so that when the first arm is set in a given position, the arm 30 may be angularly adjusted until radially aligned with one of the aspect marks indicated on the finder 28. After noting planetary indications of one aspect the arm 30 may be rotated in either direction until in a position for reading another aspect. After the aspects of one planet have been thus read arm 29 and the aspect finder 28 may be rotated until the arm is aligned with another planet, and for this new position the arm 30 is rotated to indicate aspects of the planet aligned with the arm 29. In Fig. 5, as in Fig. 1, planetary indicating pins 16a are received within recesses 15a which position these pins against accidental angular displacement.

Figure 6:
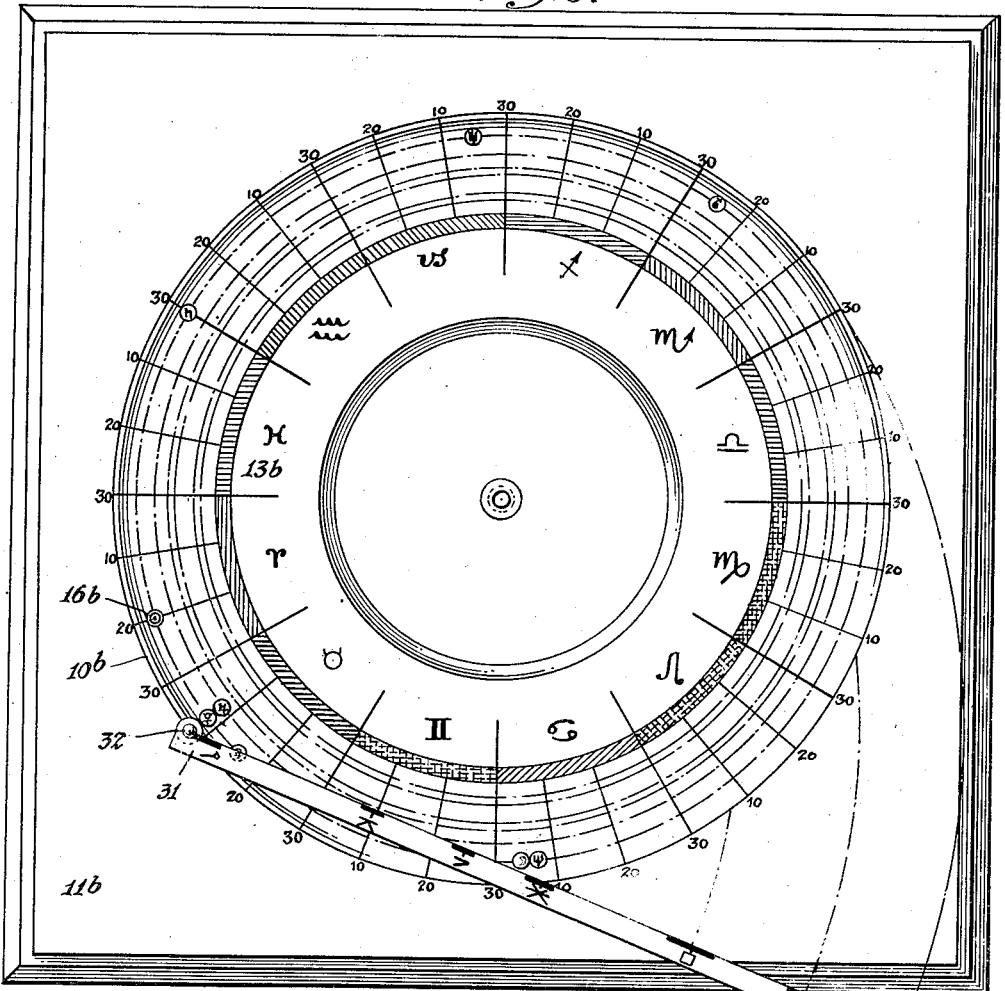
Fig. 6 illustrates still another embodiment of this invention.
Figure 7:
Fig. 7 is an end view of the device of Fig. 6.
Figure 8:
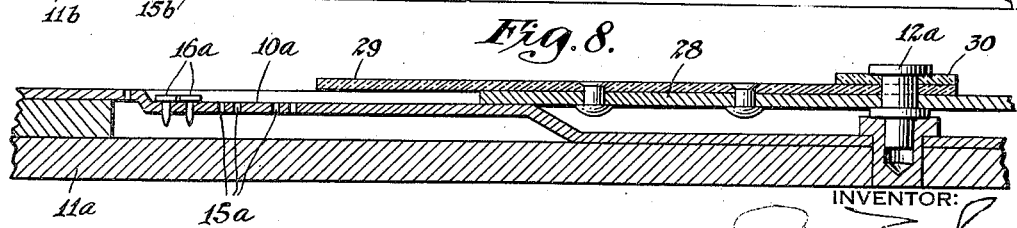
Fig. 8 is a section on the line 8—8 of Fig. 5.

In Fig. 6 the chart 10b is provided with the same type base 11b, zodiacal subdivisions 13b and recesses 15 of Figure 4 as indicated by the dot and dash line circles, but a new type of aspect finder is illustrated. This aspect finder includes a substantially rigid arm 31 pivoted by means of the pin 32 into one of the outside circular row of recesses 15 indicated in Figure 7 as 15b and radially aligned with one of the planets whose aspects are to be read, the pin 32 being thus preferably located adjacent the periphery of the chart 10b. Along the arm 31 are placed the various aspect symbols. By swinging the arm 31 until the chart periphery coincides with one of the aspect symbols, it can readily be determined what other planets are at or near this particular aspect to the first planet.

Figure 9:
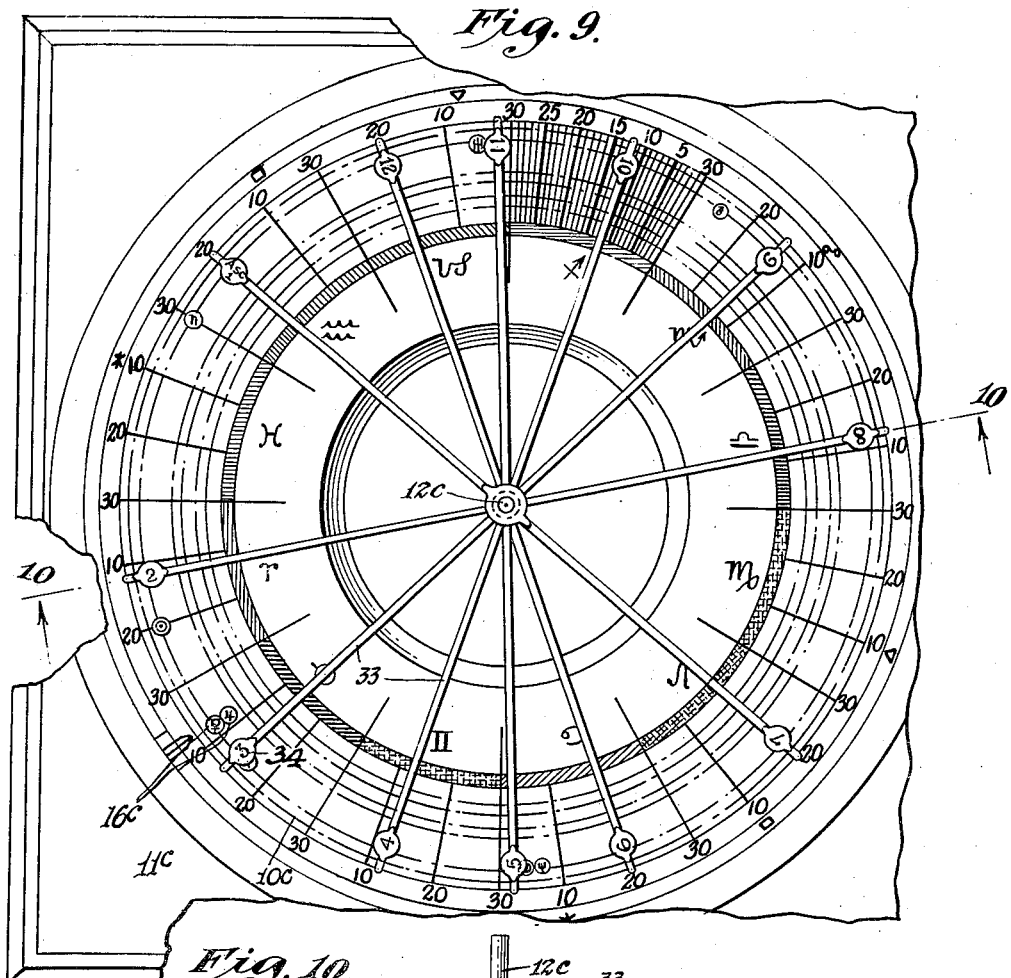
Fig. 9 shows the device of Fig. 1 for example, provided with house markers.
Figure 10:
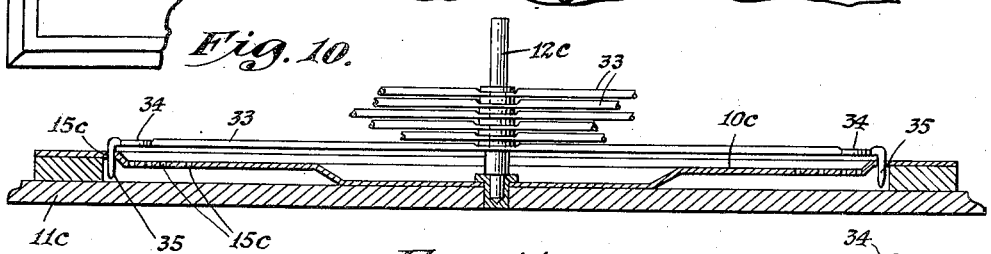
Fig. 10 is a partial view partly in section on the line 10—10 of Fig. 9.
Figure 11:
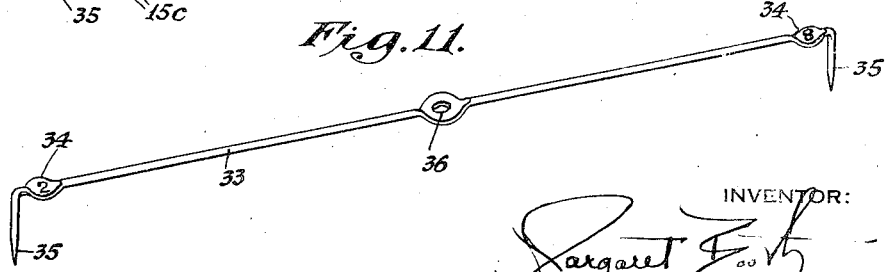
Fig. 11 is a perspective of one of the markers shown in Figs. 9 and 10.

In Figs. 9 and 10 the chart is subdivided as previously described and in addition there are six rigid arms all pivotally mounted on the axial center post 12c of the chart, these arms being designated by the numeral 33. Adjacent each end the arms are provided with markings 34 indicating the number of the house. Down turned points 35 permit the arms 33 to be engaged in some of the recesses 15c. The perforation 36 enables each rigid arm to be mounted on the chart center post 12c as shown in Fig. 10. The seventh house is always 180 degrees from the first, the eighth opposite the second, and so on. The improvement contemplated by the embodiments shown in Figs. 9 and 10 resides principally in the ability to move house divisions on a chart. The movable house divisions enable changes to be considered due to time and latitude. To find the ascendant the birth time is changed to sidereal time and with tables of houses made up for different latitudes in commonly known reference books one is readily able to determine the signs and degrees of house cusps. The operation of the device of Fig. 9 will thus be appreciated by those skilled in the art.

Among the advantages of this invention may be enumerated the simplification in the operations connected with casting horoscopes and especially the increased ease in reading aspects. With this invention it is not necessary to carry in mind the angular positions of planets, luminaries, house cusps, etc. They may all be graphically portrayed and their aspects determined at a glance after moving the pointer or radially orienting the aspect finder to one celestial body indicator and then to another. This invention should make horoscope reading possible for a greater number of people as well as facilitate the work for advanced students. The embodiment shown in Fig. 9 provides a valuable aid for rectifying the time of birth used for setting up the horoscope, to the true time of birth of an individual, group or thing. It will be understood that the device of Fig. 9 may have an aspect finder such as that described in connection with Fig. 1 applied thereto.

Another advantage of this invention is the ability of the chart to be made up for two or more persons at the same time. The planetary indicators for one person or thing may be colored in one way and those for another person or thing colored differently and thus the aspects for each planet may be read not only for one individual but for the other and harmonious or conflicting characteristics between the two individuals represented with greater ease than would otherwise be possible.

I claim:

1. An astrological chart comprising zodiacal segments and radial subdivisions thereof, a plurality of planetary indicators, means for securing said indicators in position on said chart against angular displacement thereof, an aspect finder including a rotarily mounted, adjustable annulus concentric with said segments and radially outside them, having a radially directed pointer extending to adjacent planetary indicator and being provided with a number of aspect symbols fixedly positioned on said annulus with respect to said pointer.

2. A chart for use in casting horoscopes, comprising zodiacal segments and radial subdivisions thereof, provided with a plurality of recesses into which planetary indicating pins may be received, a rotarily mounted adjustable finder for determining aspects of a planet indicating pin in any position thereof and house markers including six bars each pivoted in the central portion thereof to the chart axis and extending to adjacent the periphery of the chart and adjustable to engage their ends in some of said recesses.

3. An astrological chart having zodiacal segments and substantially radial subdivisions thereof, a plurality of planetary indicators, means for securing said indicators in position on the zodiacal segments of said chart against angular displacement, said means being adapted to enable a plurality of indicators to possess the same angular position, and an aspect finder mounted angularly adjustable with respect to said chart whereby the aspects of a plurality of horoscopes may be simultaneously considered.

4. An astrological chart having zodiacal segments and substantially radial subdivisions thereof, a plurality of planetary indicators, means for securing said indicators in position on the zodiacal segments of said chart against angular displacement, an aspect finder mounted angularly adjustable with respect to said chart, and house markers including a plurality of bars, each in a different plane, pivoted in the central portion of the chart and extending to adjacent the periphery, the ends of said bars cooperating with said chart to hold the bars against angular displacement.

5. An astrological chart having zodiacal segments and substantially radial subdivisions thereof, a plurality of planetary indicators, means for securing said indicators in position on the zodiacal segments of said chart against angular displacement, an aspect finder angularly adjustable with respect to said chart, and arranged to extend substantially outside the chart, and house markers including a plurality of radial bars pivoted at the chart central portion and extending to adjacent the periphery of the chart but radially inside said aspect finder.

MARGARET BOOTH.